US006580915B1

(12) United States Patent
Kroll

(10) Patent No.: US 6,580,915 B1
(45) Date of Patent: Jun. 17, 2003

(54) AIRCRAFT INTERNAL EMI DETECTION AND LOCATION

(75) Inventor: Mark W. Kroll, Simi Valley, CA (US)

(73) Assignee: Kroll Family Trust, Simi Valley, CA (US)

( * ) Notice: Subject to any disclaimer, the term of this patent is extended or adjusted under 35 U.S.C. 154(b) by 0 days.

(21) Appl. No.: 09/406,067

(22) Filed: Sep. 24, 1999

(51) Int. Cl.$^7$ ................................ H04Q 7/20
(52) U.S. Cl. ............... 455/456; 455/431; 455/279.1; 455/67.1; 455/67.3
(58) Field of Search ................ 455/277.1, 277.2, 455/278.1, 279.1, 296, 304, 25, 431, 63, 67.6, 456, 458, 459, 404, 405, 562, 67.1, 67.3, 226.1, 283; 342/118, 126, 139, 357.01, 357.02, 357.03, 357.08, 357.1, 147, 417, 443

(56) References Cited

U.S. PATENT DOCUMENTS

| | | | | |
|---|---|---|---|---|
| 4,352,200 A | * | 9/1982 | Oxman ........................ 455/41 |
| 4,716,417 A | * | 12/1987 | Grumet ........................ 342/2 |
| 5,230,085 A | * | 7/1993 | Loposer ...................... 333/245 |
| 5,343,493 A | * | 8/1994 | Karimullah ................. 455/456 |
| 5,444,762 A | | 8/1995 | Frey et al. |
| 5,512,908 A | | 4/1996 | Herrick |
| 5,625,364 A | | 4/1997 | Herrick et al. |
| 5,670,742 A | | 9/1997 | Jones |
| 5,678,200 A | | 10/1997 | Levi |
| 5,684,861 A | | 11/1997 | Lewis et al. |
| 5,742,666 A | * | 4/1998 | Alpert ......................... 340/426 |
| 5,856,803 A | | 1/1999 | Pevler |
| 5,873,040 A | | 2/1999 | Dunn |
| 5,877,630 A | | 3/1999 | Kraz |
| 5,883,598 A | * | 3/1999 | Parl et al. .................... 342/457 |
| 5,887,258 A | * | 3/1999 | Lemozit et al. ............. 455/11.1 |
| 5,920,278 A | * | 7/1999 | Tyler et al. .................. 342/140 |
| 6,052,604 A | * | 4/2000 | Bishop et al. ............... 455/411 |
| 6,236,359 B1 | * | 5/2001 | Watters et al. ............. 342/357.1 |
| 6,246,675 B1 | * | 6/2001 | Beasley et al. ............. 370/342 |
| 6,246,884 B1 | * | 6/2001 | Karmi et al. ................ 455/521 |
| 6,269,243 B1 | * | 7/2001 | Corbefin et al. ............ 455/427 |
| 6,314,286 B1 | * | 11/2001 | Zicker ......................... 455/422 |

* cited by examiner

Primary Examiner—Dwayne Bost
Assistant Examiner—Jean A Gelin

(57) ABSTRACT

A circuit and method to locate a cellular phone or noisy laptop computer in an aircraft uses and antenna each in the front and back of the plane. Arrival time differences of cellular phone pulses are used to locate the offending phone. Three receivers are used to locate a cell phone in a theater audience. Broad band correlation is used to locate an offending laptop computer.

12 Claims, 9 Drawing Sheets

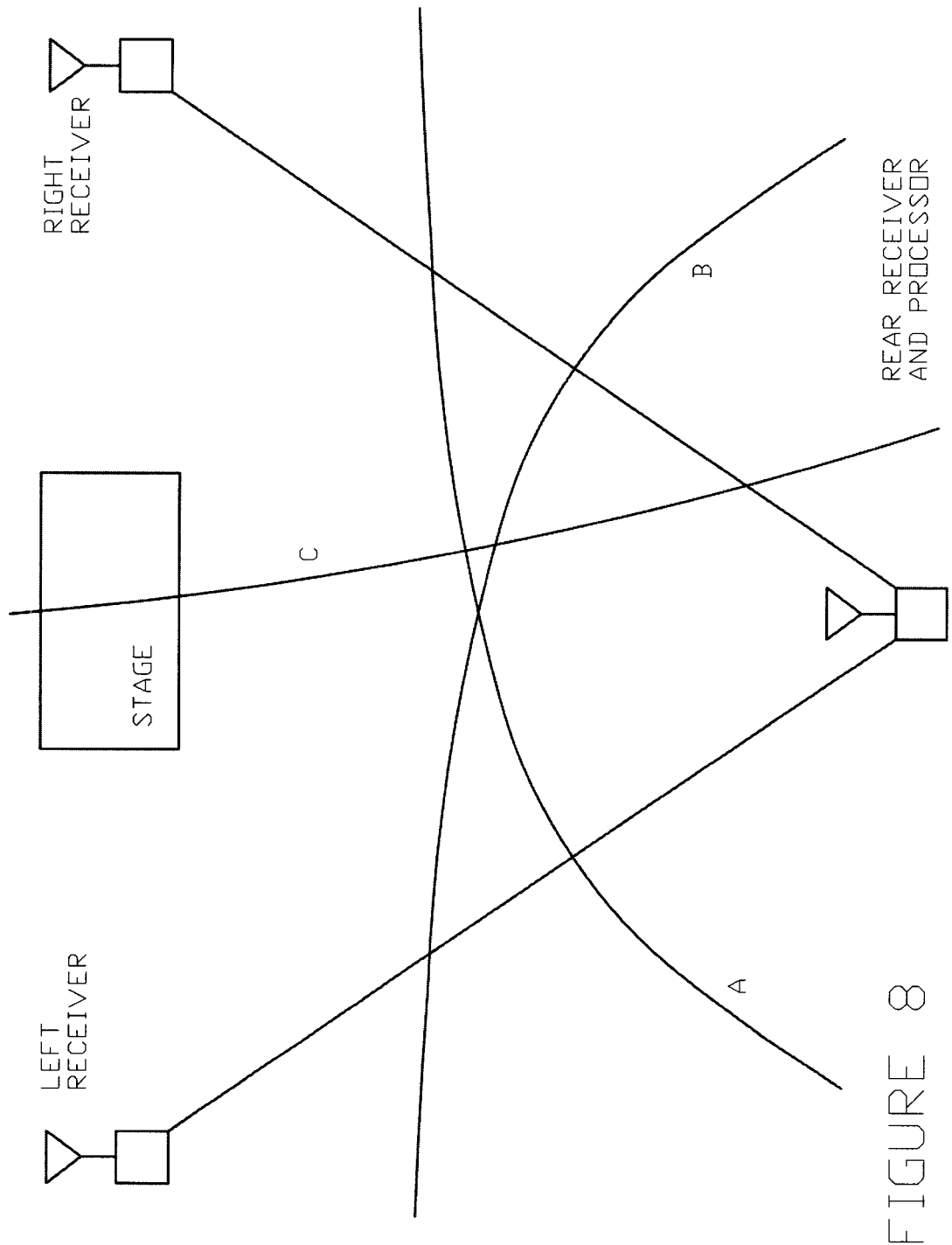

AIRCRAFT INTERNAL EMI DETECTION AND LOCATION

BACKGROUND OF THE INVENTION

Hand-held cellular phones have caused significant interference with navigation systems in commercial aircraft. While the power level on a cellular phone may be adjusted down to as low as six milliwatts for perfect connections, the power output can rise to as much as 2 watts. A hazard nearly as important in preventing that of interference with aircraft navigation is the potential paralysis of the ground-base cellular system. The ground-base cellular system is designed for people driving or moving slowly on the ground and assumes that each user is only able to communicate with a handful of antennas. These antenna locations then agree which one has the strongest signal from the user and then carry the communication. An individual in an aircraft flying over a city could literally tie up one channel each in over a hundred antennas and this could cause a great deal of inefficiency and near paralysis in the ground cellular system. For this reason, and for the concern about aircraft navigation, it is a violation of federal law to use a cell phone in an aircraft.

Nevertheless, our society has grown so accustomed to the use of the cellular phones that aircraft passengers frequently use them illegally in flight. The rules on the ground have been relaxed to the point now that most airlines will allow the use of the cellular phone until the aircraft doors are actually closed. Many passengers assume that this indicates that the rules are just another bit of bureaucracy and are beginning to ignore them in flight with potentially disastrous consequences. Importantly, many passengers simply forget to turn their phones off when they board the plane.

Unfortunately, in spite of the hazard to the aircraft safety and ground communication systems, no commercial aircraft at present have a system for detecting the cellular phone usage and no one has taught a system for locating the cellular phone in the aircraft. If a cellular phone transmission could be detected, it is still now impossible to decide which of a 200–400 passengers is using the phone—especially when one is using one of the hand-free earpieces which are essentially invisible or look like a radio earpiece.

What is needed is a system for detecting the use of a cellular phone during any time in a flight and immediately giving a location so the crew can take measures to have the cellular phone turned off.

In addition, a means is necessary for locating laptop computers, which are "noisy" emitters. Some laptop computers, typically due to modifications and peripherals, can emit significant levels of broad band electromagnetic interference (EMI).

There are many patents teaching various methods of locating a cellular phone. Representative are U.S. Pat. No. 5,512,908 of Herrick, "Apparatus and method for locating cellular telephones," and Dunn (U.S. Pat. No. 5,873,040), "Wireless 911 emergency location." All of the location techniques have a common goal of locating an emergency call from a cellular phone and are designed to give a location within several hundred feet. These inventions would clearly not be useful in an aircraft as the total dimensions of a plane are within this limit of resolution.

Other similar patents such as Herrick (U.S. Pat. No. 5,625,364), "Apparatus and method for finding a signal emission source" are doubly inappropriate for use in an aircraft, as they require moving the antenna to use phase changes to triangulate to the source.

A very interesting patent is Jones (U.S. Pat. No. 5,670,742); "EMI protected aircraft." Jones teaches the use of shielding in the aircraft windows to prevent cellular phone users from using them on the planes. One could imagine that the cost of treating aircraft windows might be cost-prohibitive.

Kratz (U.S. Pat. No. 5,877,630), "System and method for protecting an electronic device from electromagnetic radiation interference" teaches placing a detector inside sensitive circuitry. If the detector detects interfering radiation then it runs a test on the potentially effected circuitry to see if it was affected.

Lewis (U.S. Pat. No. 5,684,861), "Apparatus and method for monitoring cellular telephone usage." This is essentially a usage meter that would be tacked on to a rental cellular phone. The meter runs when its circuitry detects cellular phone transmission.

The system of Levi (U.S. Pat. No. 5,678,200), "Independent wideband RF transmission detector for cellular telephone," teaches a detector in a car which would shut off the stereo system when someone is using their hand-held cellular phone to make it easier to listen.

The invention of Pevler (U.S. Pat. No. 5,856,803), "Method and apparatus for detecting radio-frequency weapon use," teaches a military defense system which continuously looks for the spectral signatures of intentional radio frequency interference. At the end of the specification Pevler mentions radio frequency interference detecting and cellular phone number recording it. He does not say what to do with the number, how one would use it for prosecution, how one would identify the offending passenger, or how one would locate the offending passenger.

Frey (U.S. Pat. No. 5,444,762), "Method and apparatus for reducing interference among cellular telephone signals," teaches the use of an air cellular system which allows transmissions from the aircraft but is careful to use unused channels and is also careful to beam the signal in such a way that it will not interfere with ground base cellular systems.

Thus in spite of an obvious need, no one has taught any system for locating and identifying a cellular phone transmission within an aircraft.

BRIEF DESCRIPTION OF THE DRAWINGS

FIG. 8 Shows a three antenna embodiment of the invention.

DETAILED DESCRIPTION OF THE DRAWINGS AND PREFERRED EMBODIMENT

Figure 1:
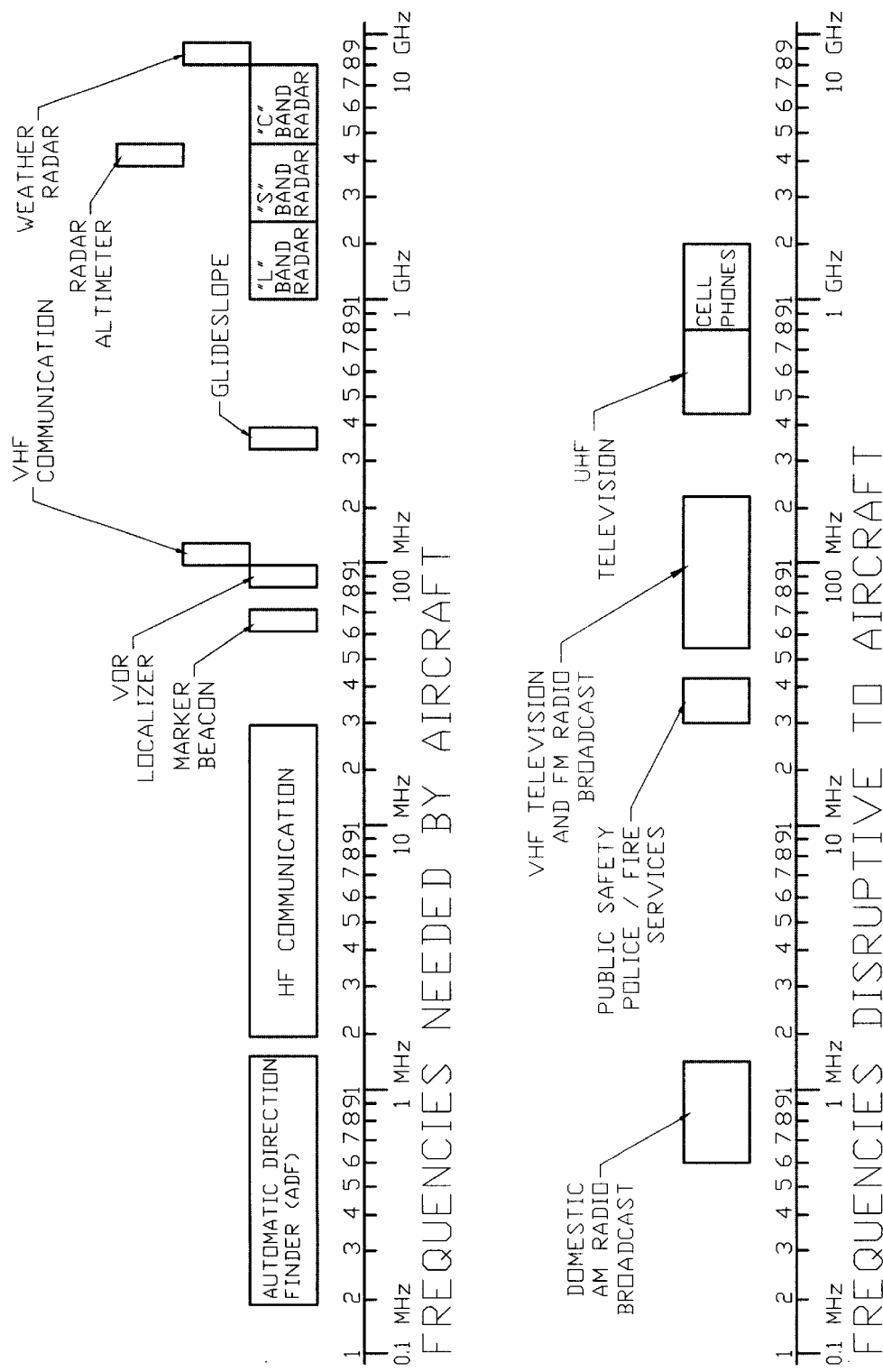
FIG. 1 Shows the typical frequencies of aircraft electronics (avionics) and potential interfering offenders.

FIG. 1 shows the basic frequencies used in communication systems for cellular phones and the frequencies used for aircraft communication and navigation systems. It can be seen that there are many opportunities for interference.

Figure 2:
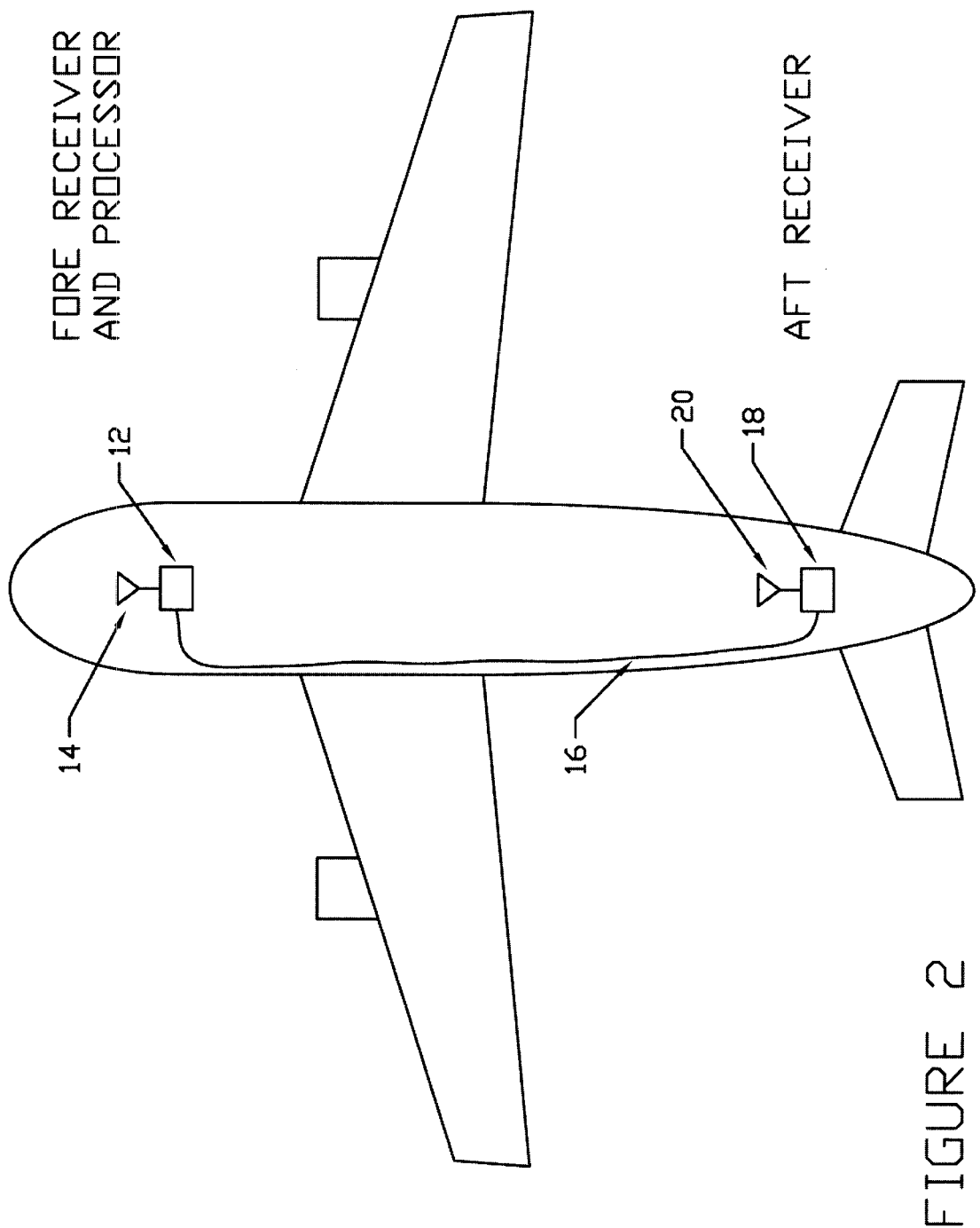
FIG. 2 Shows the basic schematics of the system in an aircraft.

FIG. 2 shows the basic schematic of the system in an aircraft. The aircraft 10 has a receiver in the fore (front) of the aircraft 12 and processor system connected to antenna 14. The aft (back) receiver 18 is connected to antenna 20 and transmits its signal through a high-speed cable 16 to the fore receiver and processor for location processing.

Figure 3:
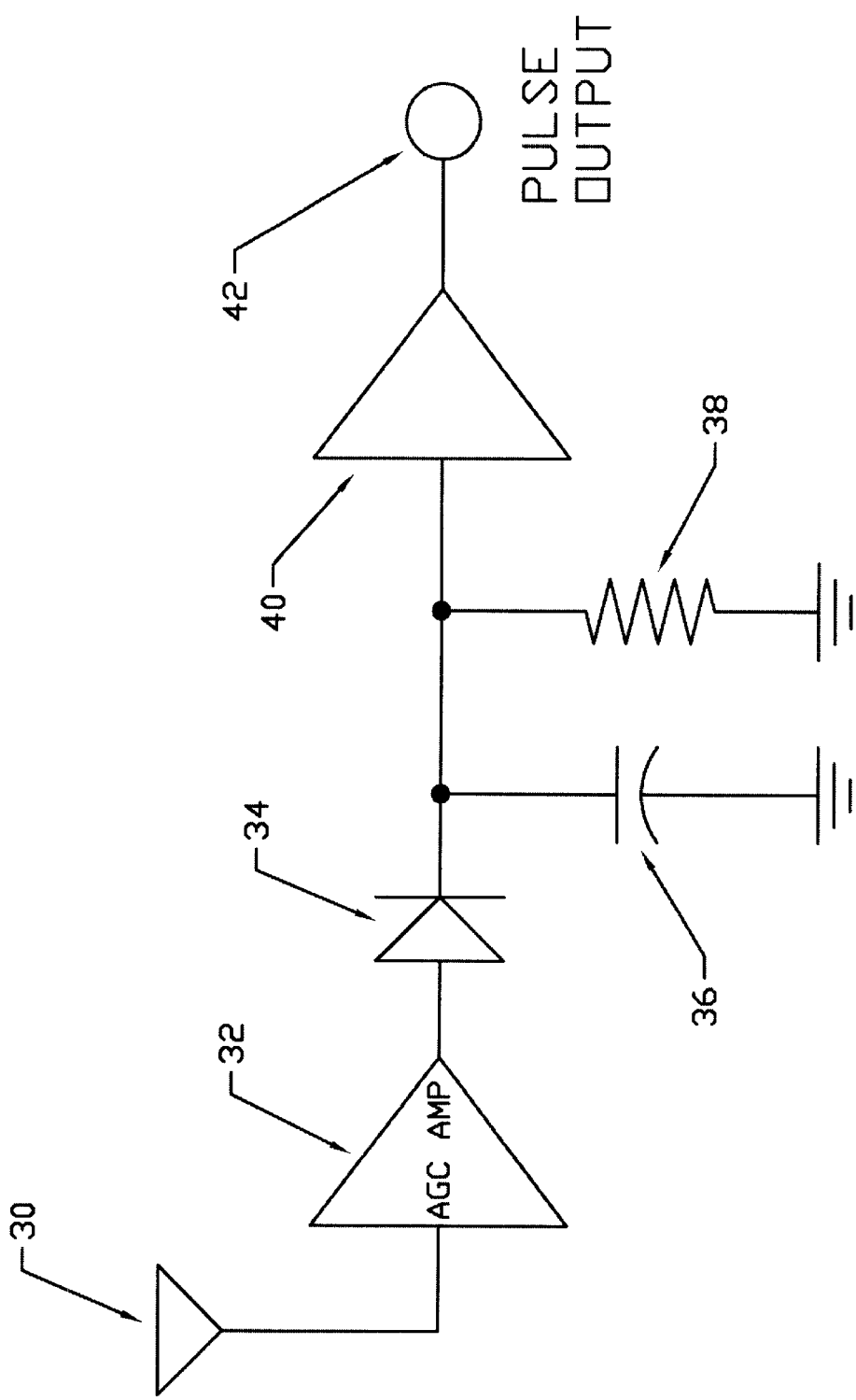
FIG. 3 Shows the basic schematics of the receiver for the system.

The basic analog system is shown in the receiver shown in FIG. 3. Here antenna 30 transmits the radio frequency signal to amplifier 32, which increases the gain to give a signal of at least 1 volt amplitude output. That signal is rectified by diode 34 and demodulated with a combination of diode 34 and capacitor 36 and resistor 38. That demodulated signal is then amplified by amplifier 40 and delivered as a pulse output on node 42.

Figure 4A:
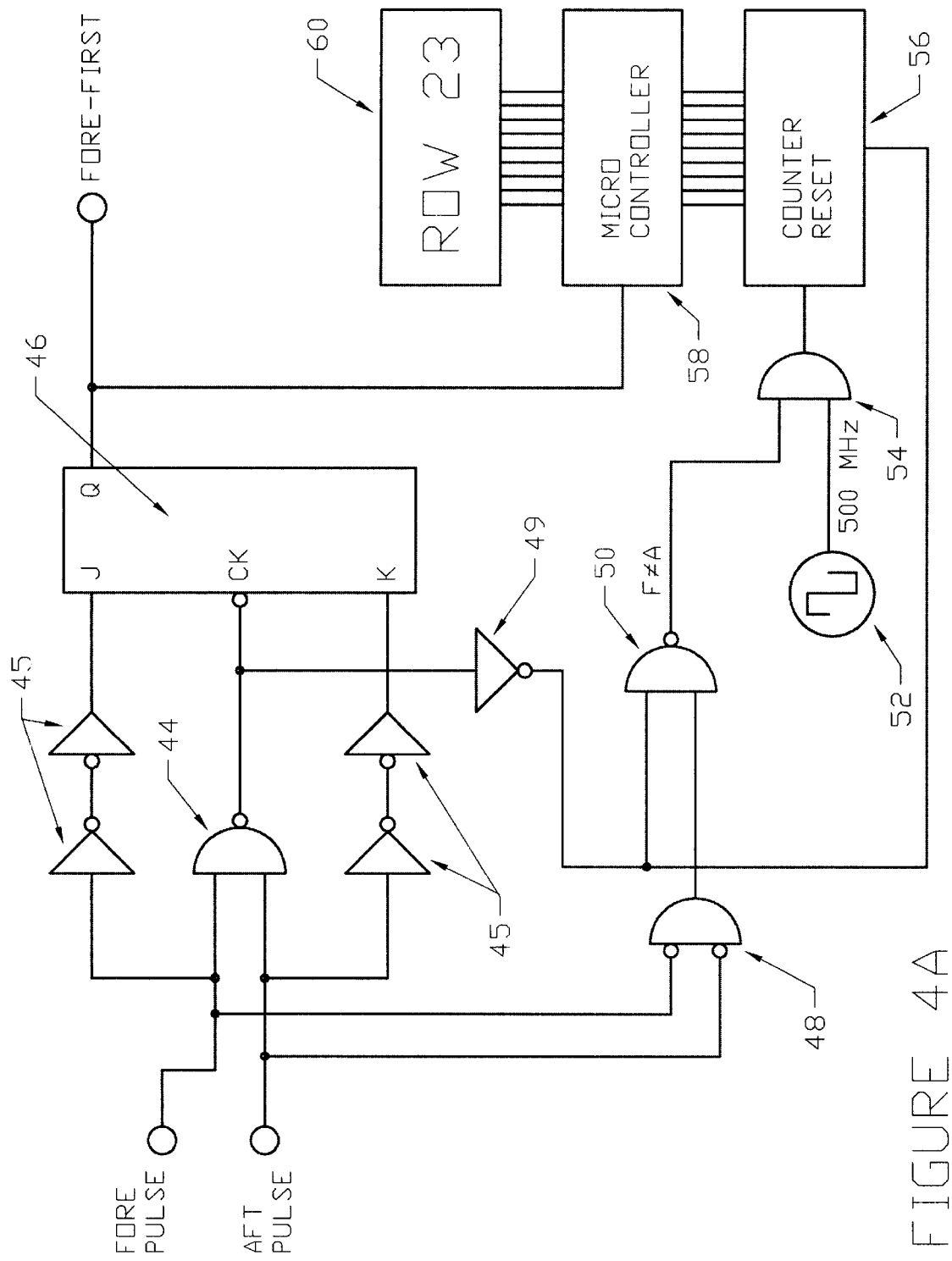
FIG. 4 Shows the basic schematics of the digital circuitry of the system.
Figure 4B:
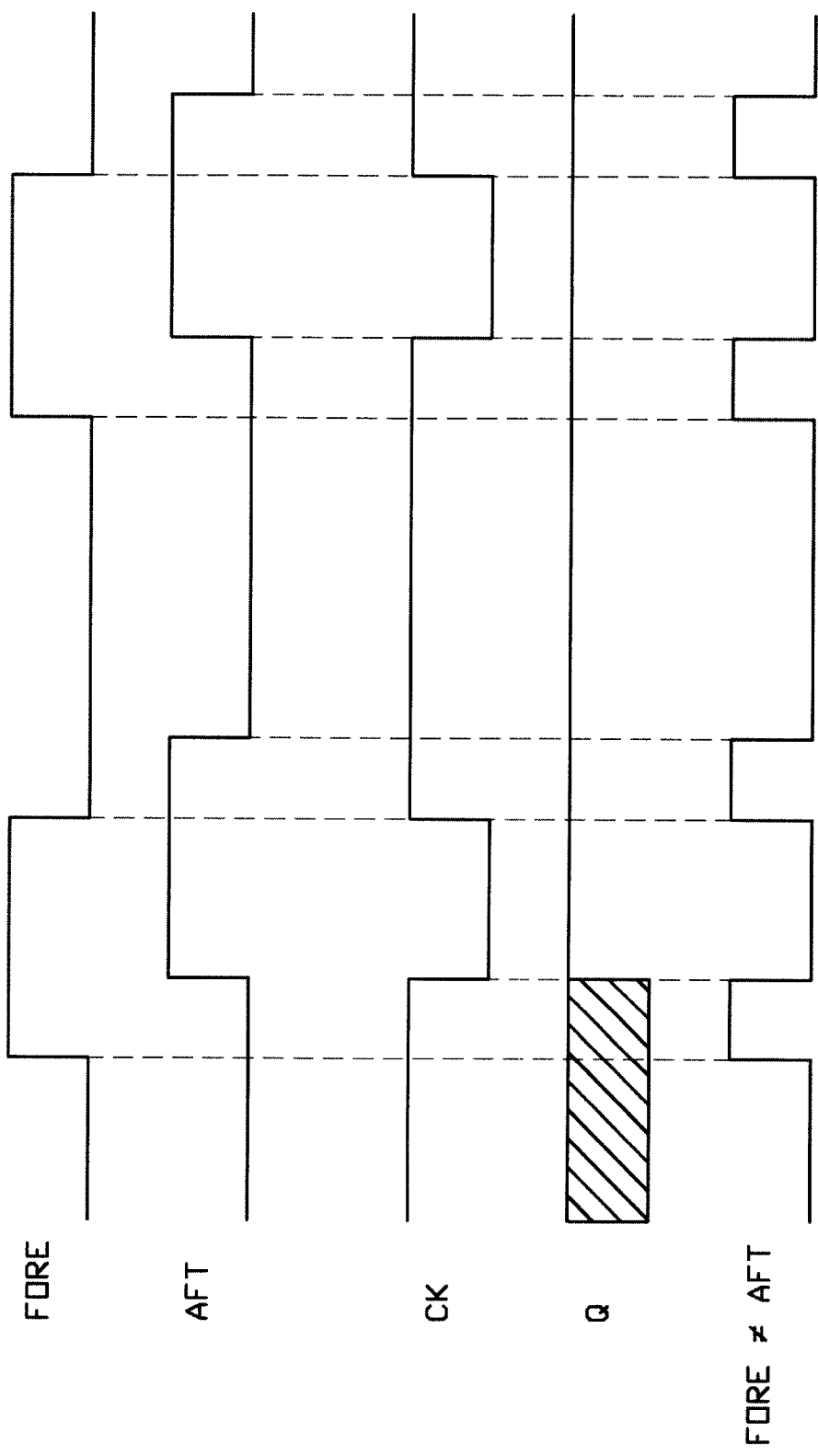

That pulse output is fed to the digital subsystem shown in FIG. 4a. That basic strategy is to see whether the fore pulse or aft pulse comes first with high precision in order to locate the row that the offending cellular phone is in. This is done with a digital circuitry shown in FIG. 4a. The fore pulse and aft pulse feed nor gate 44 and the fore pulse and aft pulse come into nand gate 44 so that when both pulses are high a low clock signal is generated. The fore pulse and aft pulse are also delayed through inverters 45 so that they will appear at the J and K inputs of flip-flop 46 slightly after the clock pulse appears. As seen in FIG. 4b this results in a Q output of the flip-flop 46 being high when the fore pulse arrives first. This is the key for the circuit's ability to recognize which antenna the cellular phone is closest to. Since electromagnetic waves travel at approximately one foot per nanosecond this information can be used to calculate the relative distance from the cellular phone to aircraft antennas. The fore and aft signals also go into negative input nand gate 48 and then join into the nor gate 50 with the inverted clock signal through inverter 49. This generates a signal fore-not-equal-to-aft which means that the one antenna has received a cellular phone pulse but the other antenna has not yet received it. That fore-not-equal-to-aft signal is anded with a 500 MHz oscillator 52 through nand gate 54. This signal is fed into counter 56. This counter is reset with every pulse out of the inverted clock line from inverter 49 to continuously measure the difference in arrival time between the two antennas. The calculation is very straightforward. If the fore pulse arrives six clock signals before the aft pulse that means that it arrives 12 nanoseconds earlier. That meant that the cellular phone is 12 feet closer to the fore antenna than it is the aft antenna. That means that the cellular phone is about six feet in front of the center of the aircraft. In this case, the center of the aircraft is defined as the midpoint between the fore and aft detection antennas. A resolution of one or two feet is certainly sufficient to locate the row of the offending cellular phone. The output of the counter is then fed to micro controller 58 which calculates the location in feet from the center of the plane then calculates, based on its data base of seat positions, the exact row the cellular phone is located in. This is displayed in display 60.

Figure 5:
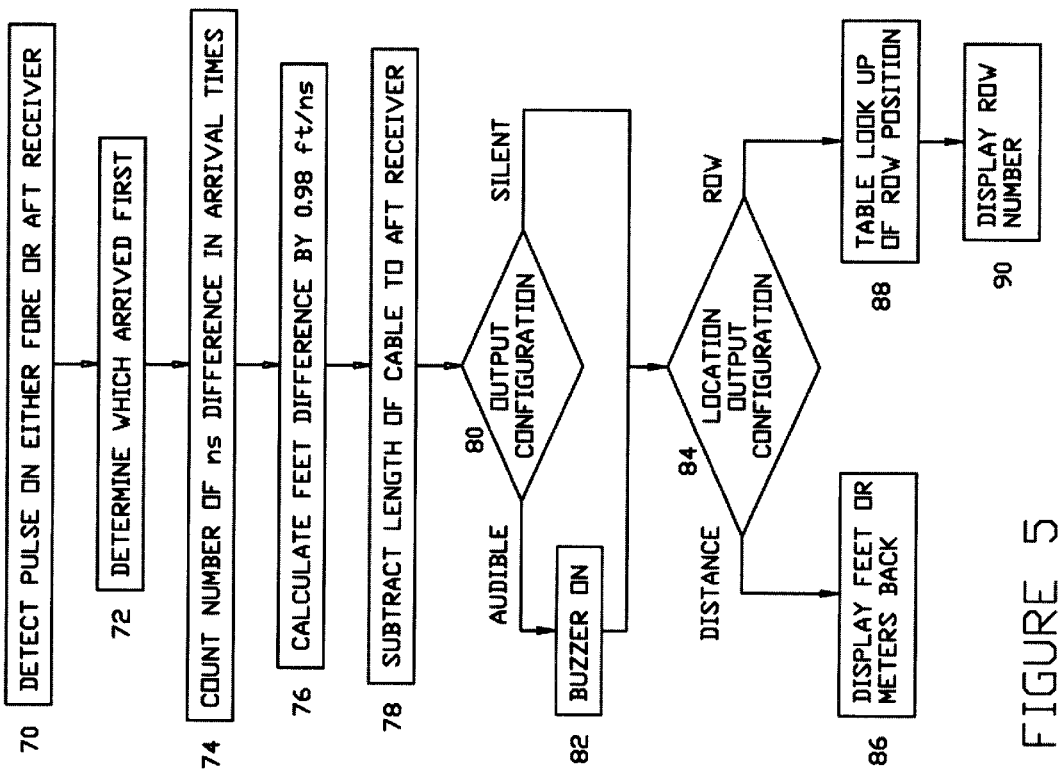
FIG. 5 Shows the basic method of the invention.

The method of the embodiment of this invention is shown in FIG. 5. In step 70 the system detects a pulse on either the fore or aft receiver and then in step 72 determines which arrives first. In step 74 the system counts the number of nanoseconds difference in arrival times.

In step 76 the feet difference is calculated by the division of 0.98 feet per nanosecond. In step 78 the system will subtract the length of the cable to the aft receiver. This is an important correction in that the signal from the aft receiver will always appear at least "100 feet" or 100 nanoseconds later than the fore receiver since the aft pulse must travel up the cable. This is a simple subtraction that can be performed by the micro controller shown as circuit 58 in FIG. 4a.

The system then looks at the output configuration in decision step 80. If the system is set up for silent operation then it goes on to step 84. If it is set up for audible operation then it will trigger a buzzer in step 82 to alert the flight attendants that there is a cell phone in use in the aircraft.

In step 84 the decision is made as far as the location output configuration. If distance was set then the system goes to step 86 and will display the distance in feet or meters from the back of the plane or from any other desired landmark. If row location was selected in step 88 then the system will look up row positions and then in step 90 display the exact row number.

Figure 6:
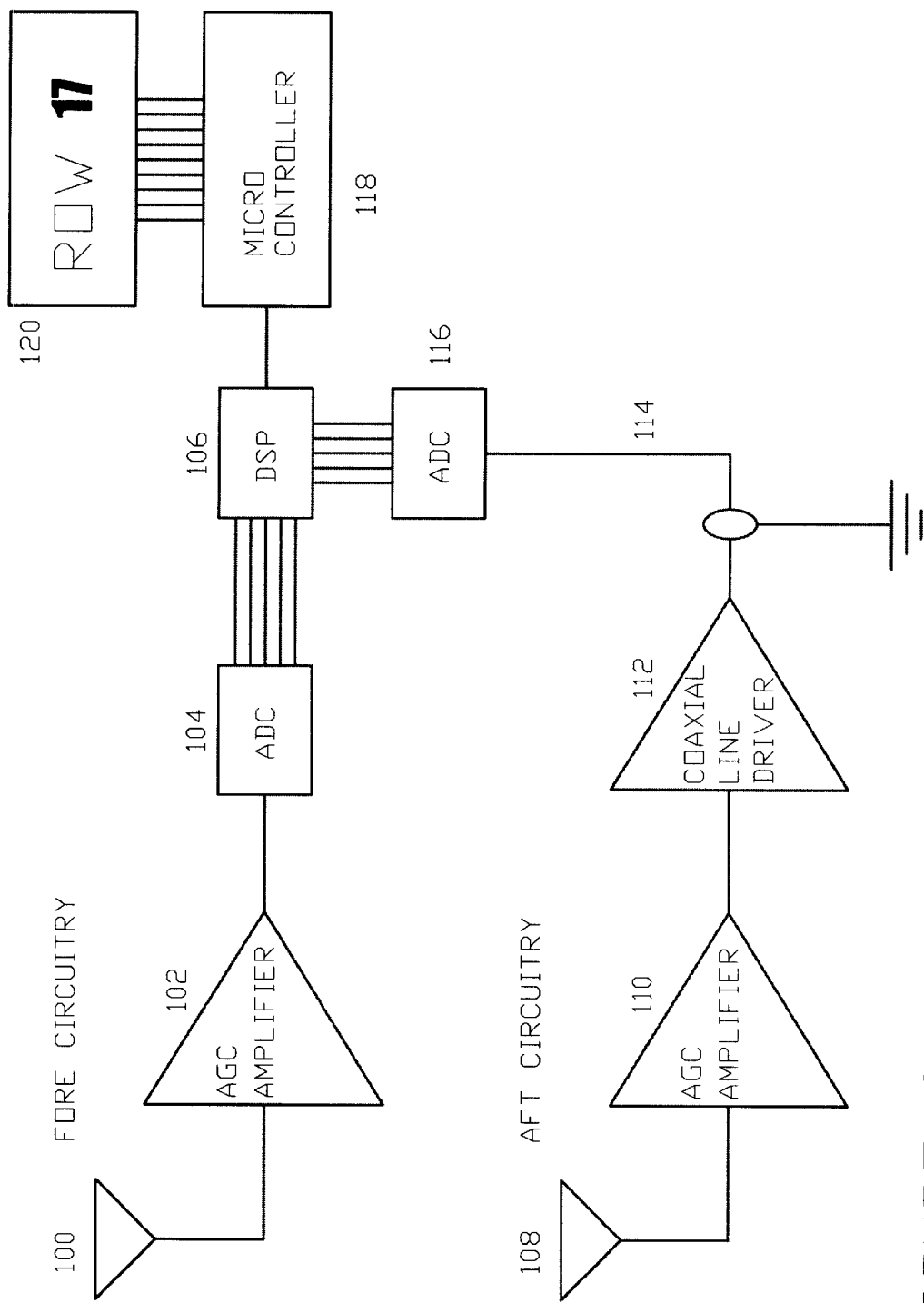
FIG. 6 Shows the basic circuitry for the laptop computer detection embodiment of the invention.

FIG. 6 shows a continuous correlation scheme that would be necessary for use with detection of laptop computer broad band emissions. Since cellular phones operate on a pulse train they are easily located with the circuit in FIG. 4a. For example the pulses shown in FIG. 4b for a United States digital system such as IS-54-b would show a pulse of 33.3% duty cycle as three users could be on a single channel. Some more modem systems such as the New American IS-95-a and the European GSM standard transmit with a 12.5% duty cycle. Thus the pulse would be high ⅛th of the time.

Unfortunately the simple scheme of FIGS. 4a and 4b will not work for the continues broad band noise of the laptop like it would for the digitally pulsed cellular phone in FIG. 6 shows the fore antenna 100 feeding an AGC (automatic gain control) to amplifier 102 which then feeds into an analog to digital converter in box 104. That is then fed into a digital signal process (DSP) circuit which will process that information along with that from the aft circuitry.

The aft circuitry involves an antenna 108 feeding into an AGC amplifier 110 which then feeds into a coaxial line driver 112 that drives the high frequency signal down the coaxial cable 114 up to the ADC in the fore system 116. Those two now digital signals are mixed in the DSP 106 for a calculation of arrival time difference through a correlation analysis. That is then passed on to the micro controller 118 to locate the offending broad band signal source which typically will be a laptop computer. That is then passed to the display 120 to show the row location of the offender.

Figure 7:
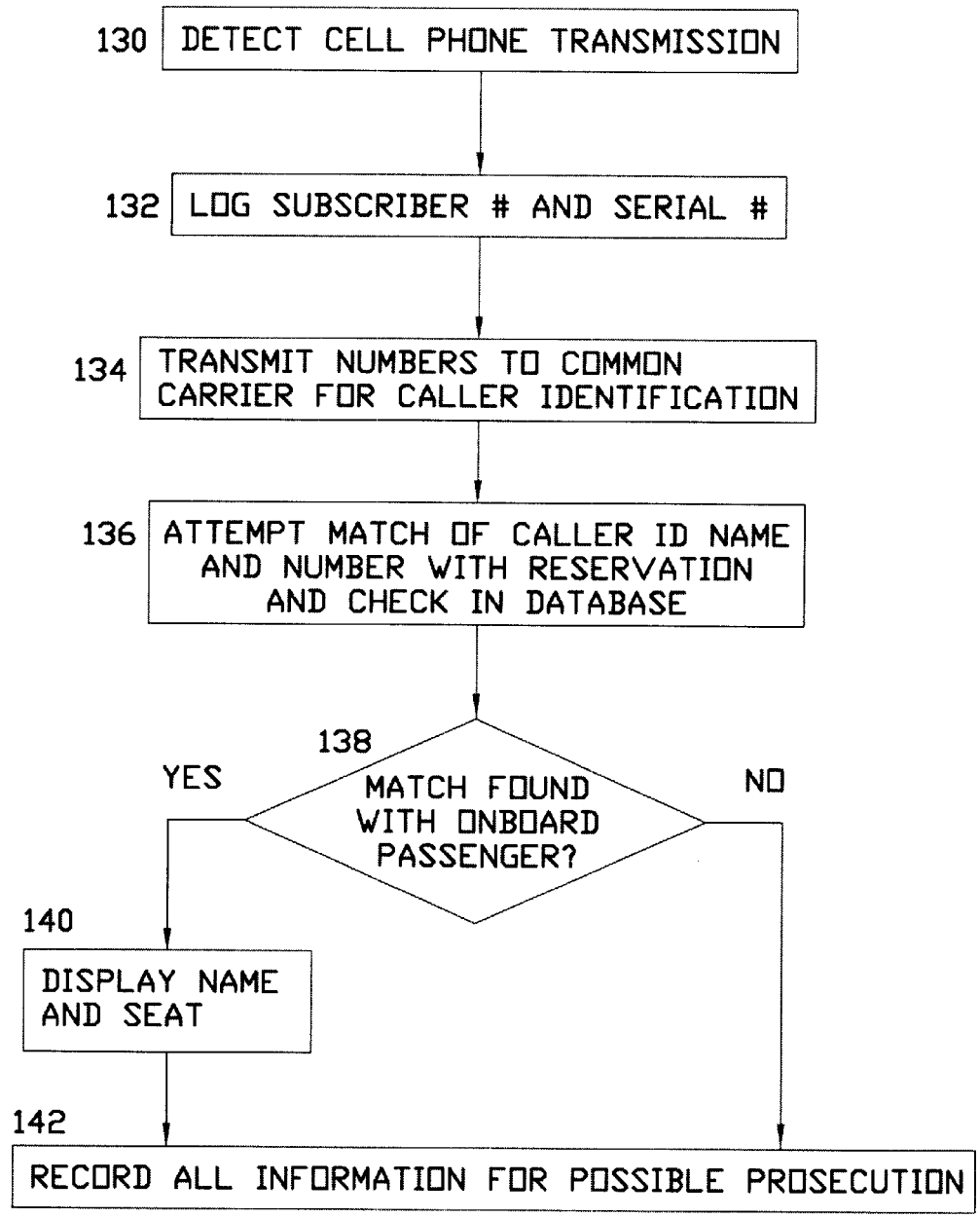
FIG. 7 Shows the flow chart for the embodiment of the invention using data base matches to identify the offending user.

FIG. 7 shows the method of an alternative and adjunctive embodiment for this invention. Step 130 of the system will detect a cellular phone transmission. In step 132 it will log the subscriber and serial number. In step 134 those numbers will be transmitted down to the ground to a common carrier for a caller identification attempt.

In step 136 an airline system will attempt to match the caller id with a name and number with a reservation and check-in database. At decision 138 the system will see if it was able to make a plausible match with an on-board passenger. If the answer is "no" then the method just goes on to step 142 to record information for a possible later prosecution. If a match is found in step 138 then it goes on to step 140 to display the name and the seat location of the passenger to the flight attendants for immediate interaction.

A final embodiment involves the addition of a signal strength meter on the output of amplifier FIG. 3. This could be easily made in a small battery operated hand-held system and a flight attendant could carry this down the aisle either openly or surreptitiously to get the strongest signal to identify the offending passenger.

FIG. 8 shows the use of the invention to locate a cellular phone in a theatre. Cell phone calls in audiences are a highly irritating nuisance and should be detected before a performance begins. Because the universe of locations is now two dimensional (instead of one for airplanes) the system uses three receivers. The time of arrival differences give hyperbolas for potential location loci. For example, when the Rear Receiver receives the cell phone signal before the Left Receiver, then the phone will be found on a hyperbola such as that depicted by curve A. The intersection of curves A, B, and C gives an accurate location of the offending cell phone.

I claim:

1. A system comprising a first antenna located near the front of an aircraft cabin connected to an amplifier connected to a timing circuit, a second antenna located near the rear of an aircraft cabin connected to an amplifier connected to the first said timing circuit such that the difference in the arrival times between the two signals at antenna and the second antenna are used to determine the location of a electromagnetic interference producer between the two antennas.

2. The system of claim 1 in which a system is optimized to locate a cellular phone as the electromagnetic interference producer.

3. The system of claim 1 in which a system is optimized to locate a laptop computer as the electromagnetic interference producer.

4. The system of claim 1 in which a pulse arrival time is used to determine the location of the electromagnetic interference producer.

5. The system of claim 1 in which a broad band continuous correlator is used to locate the offending electromagnetic interference producer.

6. The system of claim 1 in which a row location of the electromagnetic interference producer is given as an output.

7. A method of deriving the location, in an aircraft, of an electromagnetic interference producer comprising the steps of installing two antennas, detecting the output of each of the two antennas, measuring the time difference between the outputs, calculating a actual linear dimensional difference corresponding to the time difference based on the speed of light, subtracting the cable length difference between the two antennas, and calculating a location of the electromagnetic interference producer between the two antennas.

8. A method of claim 7 in which the system is optimized to locate an offending cellular phone.

9. The method of claim 7 in which the system is optimized to detect an offending laptop computer.

10. The method of claim 7 in which the pulse arrival time is used for the location of the offending electromagnetic interference producer.

11. The system of claim 7 in which a broad band correlator is used to locate the offending electromagnetic interference producer.

12. The system of claim 7 in which the row of the offending electromagnetic interference producer is output.

* * * * *